INVENTORS,
PIERRE M. LUCAS,
JEAN F. DUQUESNE,
JEAN-PIERRE L. BERGER,
JEAN-PIERRE DISSEL
BY
Abraham A. Saffitz
ATTORNEY INVENTORS,
PIERRE M. LUCAS,
JEAN F. DUQUESNE
JEAN-PIERRE L. BERGER,
JEAN-PIERRE DISSEL
BY Abraham A. Saffitz
ATTORNEY INVENTORS,
PIERRE M. LUCAS,
JEAN F. DUQUESNE,
JEAN-PIERRE L. BERGER,
JEAN-PIERRE DISSEL
BY
Abraham A. Saffitz
ATTORNEY INVENTORS
Pierre M. LUCAS,
Jean F. DUQUESNE,
Jean-Pierre L. BERGER,
Jean-Pierre DISSEL BY Abraham A. Saffitz
ATTORNEY

Fig. 4

| ORDER $O_1$ | FIRST GROUP OF EXTERNAL CONDITIONS | | | | ORDER $O_2$ | SECOND GROUP OF EXTERNAL CONDITIONS | | | | | | ORDER $O_3$ | | | FUNCTION AT CONSECUTIVE TIME $t_o$ |
|---|---|---|---|---|---|---|---|---|---|---|---|---|---|---|---|
| | BIR | BIT | BAR | BDE | | E | E' | FØ | BDE | BDO | BDP | FUNCTION | ADVANCE IN 30 | ADVANCE IN 21 | |
| $L_o$; J1 | 1 | Ø | Ø | Ø | $(a_\tau) \rightarrow 14$ | | | | | | | $L_o$ | -0 | $u_\tau$ | — |
| $L_o$; J1 | 0 | 1 | Ø | Ø | $(a_t) \rightarrow 14$ | | | | | | | $L_o$ | -0 | $u_t$ | — |
| $L_o$; J1 | 0 | 0 | 0 | Ø | WP; J2; TLR | Ø | Ø | Ø | 0 | 0 | 0 | TAB | +0 | — | PBA |
| | | | | | | Ø | Ø | Ø | 1 | 0 | 0 | TAB | +x | — | PBA |
| | | | | | | 1 | 1 | 0 | Ø | 1 | 0 | $E_o$; TAB | +0 | — | PBA |
| | | | | | | 0 | 0 | 0 | Ø | 1 | 0 | | | | |
| | | | | | | 1 | 1 | 0 | Ø | 1 | 1 | $E_o$; TAB | +1 | — | — |
| | | | | | | 0 | 0 | 0 | Ø | 1 | 1 | | | | |
| | | | | | | 0 | 1 | Ø | Ø | 1 | 0 | $E_o$; TAB | -0 | — | PBA |
| | | | | | | 1 | 0 | Ø | Ø | 1 | 0 | | | | |
| | | | | | | 0 | 0 | 1 | Ø | 1 | 0 | | | | |
| | | | | | | 1 | 1 | 1 | Ø | 1 | 0 | | | | |
| | | | | | | 0 | 1 | Ø | Ø | 1 | 1 | $E_o$; TAB | -0 | $(h_o; \varphi_o)$ | — |
| | | | | | | 1 | 0 | Ø | Ø | 1 | 1 | | | | |
| | | | | | | 0 | 0 | 1 | Ø | 1 | 1 | | | | |
| | | | | | | 1 | 1 | 1 | Ø | 1 | 1 | | | | |

INSTRUCTION $IF_o$

INVENTORS,
PIERRE M. LUCAS,
JEAN F. DUQUESNE,
JEAN-PIERRE L. BERGER
JEAN-PIERRE DISSEL
BY Abraham A. Saffitz
ATTORNEY United States Patent Office 3,497,630

Patented Feb. 24, 1970

3,497,630
CONDITIONAL STORED PROGRAM COMPUTER FOR CONTROLLING SWITCHING NETWORKS

Pierre M. Lucas, 20 Rue Tariel, Issy-les-Moulineaux, France; Jean F. Duquesne, 41 Rue Esquirol, and Jean-Pierre L. Berger, 124 Boulevard Auguste Blanqui, both of Paris, France: and Jean-Pierre Dissel, 192 Avenue Pierre Brossolette, Malakoff, France Filed July 3, 1967, Ser. No. 650,939
Claims priority, application France, July 6, 1966, 68,457
Int. Cl. H04m 3/22
U.S. Cl. 179—18 2 Claims

ABSTRACT OF THE DISCLOSURE

Conditional stored program computer for controlling a telephone switching network in which there is written in the permanent store of the computer instructions forming fixed sequences or routines and instructions forming variable sequences since the instructions proper of these sequences or the number thereof are likely to be changed. If the fixed sequences and the variable sequences are written-in the ones after the others without blanks, the change of one variable sequence, for instance its extension, entails a general rearrangement of the permanent store. To prevent this drawback, the routines are numbered and written-in the telephone registers and only very concise jump instructions are written in the normal part of the permanent store. The detailed instructions of the variable routines are written in a special part of the permanent store. The jump instruction has for its address the old routine number and for its contents the new routine number and the address of the first instruction of the new routine.

This invention relates to a recorded program parallel type electronic digital computer, of use more particularly for controlling the operation of an automatic telephone switching system.

Such computers are known in the prior art. It is also known that the computer operating program for telephone register processing can be broken down into two parts—rapid recurrence analysis program (PMR), whose main function is to supervise, by rapid analysis or scanning of test points, the binary sequential signals transmitted over the lines and slow recurrence program (PML), whose job is to perform all the other logic operations which are required for trunking and which can readily be delayed for a few tens of milliseconds. In practice, since the registers have to deal either with a single line (the calling line) or with two lines (the calling line and the called line), two rapid recurrence analysis programs ($PMR_0$ and $PMR_1$) and two slow recurrence program ($PML_0$ and $PML_1$) must be considered as existing simultaneously.

Corresponding to each rapid recurrence analysis program $PMR_0$ and $PMR_1$ in the telephone register is a phase data item distinguishing that fraction of the corresponding program at which the register is disposed at the particular time concerned. These two data items are parts of the words which are stored in the telephone register at this time.

The processing phases of a telephone register return periodically in normal program performance. At each phase the computer must select in a permanent program store the instructions to be undertaken in dependence upon the happening or non-happening of an expected new event in the particular phase concerned. Such event can be e.g. the arrival of a signal over the supervised line, the reply to an order or to a previous interrogation by an external element, such as the switching network or a magnetic drum with which the computer is associated; it can be also the expiray of a predetermined delay.

Consequently, each program phase is followed by either the same phase or a different phase relation either to the subsequent register or to the same register. Each phase is determined by an instruction which is in the permanent program store. Actually, one particular instruction, known as the fundamental instruction $IF_0$, returns more often than the others and is the one which is limited to reading the register word in the event of absence of any special happening, such as the appearance of a signal on the supervised line or the expiry of a delay concerning such phase and if it is also recognised that the register has only a single line to supervise. The program $PMR_0$ is therefore looped back to the same fundamental instruction $IF_0$, which is performed for the next telephone register, and so on.

If no particular event is noted but it is found that the register is required to supervise a second line, a second fundamental instruction $IF_1$ is implemented to detect events occurring on the second line or the expiry of a delay concerning signals transmitted over the second line. As in the previous case if nothing is found the program is looped back to the fundamental instruction $IF_0$ for the next register.

If any special event is found during implementation of either of the two fundamental instructions $IF_0$ or $IF_1$, the logic operations to be performed, which are very varied, require the fast-analysis program to be prolonged by a sub-program appropriate for the phase which the register is then in and for the kind of event found, such as the start or end of a binary signal, expiry of a delay and so on. Since the number of sub-programs is very high, a routing operation is essential for very rapid finding of the address, in the permanent program store, of the first instruction of the phase sub-program to be brought into operation.

In the prior art computers for telephone switching this address of the new instruction can be gathered from the address of the previous instruction in two ways. Some phases are automatically linked with one another and form a routine, and so the address of the instruction corresponding to the next phase depends upon the nature of the present phase—i.e., upon the address of the corresponding instruction. An address increment is therefore associated with each instruction, and an address computer deduces the address of the next instruction from the address of the present instruction by adding thereto the address increment. This manner of determining instruction addresses is of use only for unvarying routines.

A fresh instruction address, called a transfer address, which does not depend at all or does not depend only upon the address of the instruction actually in use can also be deduced from the external conditions found in the case of said actual instruction. The incremental procedure is then inhibited, and a fresh instruction address unconnected with the former address is prepared by logic circuits having as inputs the external condition sensors.

The invention maintains the unconditional or conditional transfer of instruction control just described and simultaneously uses another procedure. The permanent or semipermanent program store contains, in addition to the list of instructions and the associated address increments, a two-part phase table, the first part containing, at addresses which depend upon the present phase written into the telephone register or which are equal to such phase, routing directives RD having as main contents a parameter representing the address of the initial instruction of a sub-program, and the second part of the phase table contains the new phase, means being provided to substitute this new phase for the former phase in the register. As will be apparent, jumping from one instruction of a routine to the first instruction of another routine, is effected not by the preparation of a transfer address from the external conditions and the present phase but by changing over from the external conditions and the present phase first to an intermediate routing directive, whose address is the present phase (or depends on the present phase), and then by subsequent changeover to a sub-program instruction whose address is exactly the content of the routing directive.

The phases can be considered as the serial numbers of the routines. It might appear uninteresting, instead of jumping from an instruction of a first routine to the first instruction of a second routine, to jump, in a first step, from the instruction of the first routine to a special routing directive and, on a second step, from this special routing directive to the first instruction of the second routine. However, this processing has an actual interest. As a matter of fact, some routines may comprise variable instructions and/or a variable number of instructions. If these variable routines were written in the permanent program store, together with the permanent routines, in consecutive lines of the store without leaving blanks, they could not be extended or varied without requiring a general rearrangement of the store. It can be said that the first part of the phase tables which comprises the schedule of the special function directives is similar to the table of contents of a book which only gives the titles of the chapters and the second part of the phase table which comprises the instructions of the variable routines is similar to the subject index of the book which enumerates all the paragraphs of each chapter. The program jumps first to the content table and then to the first line of the subject index. The access to the following lines of the subject index is performed by an incremental address processing.

The invention will now be described in detail with reference to the accompanying drawings wherein:

FIGS. 1*a*, 1*b* and 1*c* show in the form of a block diagram the computer according to the invention for an electronic telephone switching system;

FIG. 4 shows the various possible processings of a fundamental instruction $IF_0$.

CHAPTER I

General organization

Figure 1A:
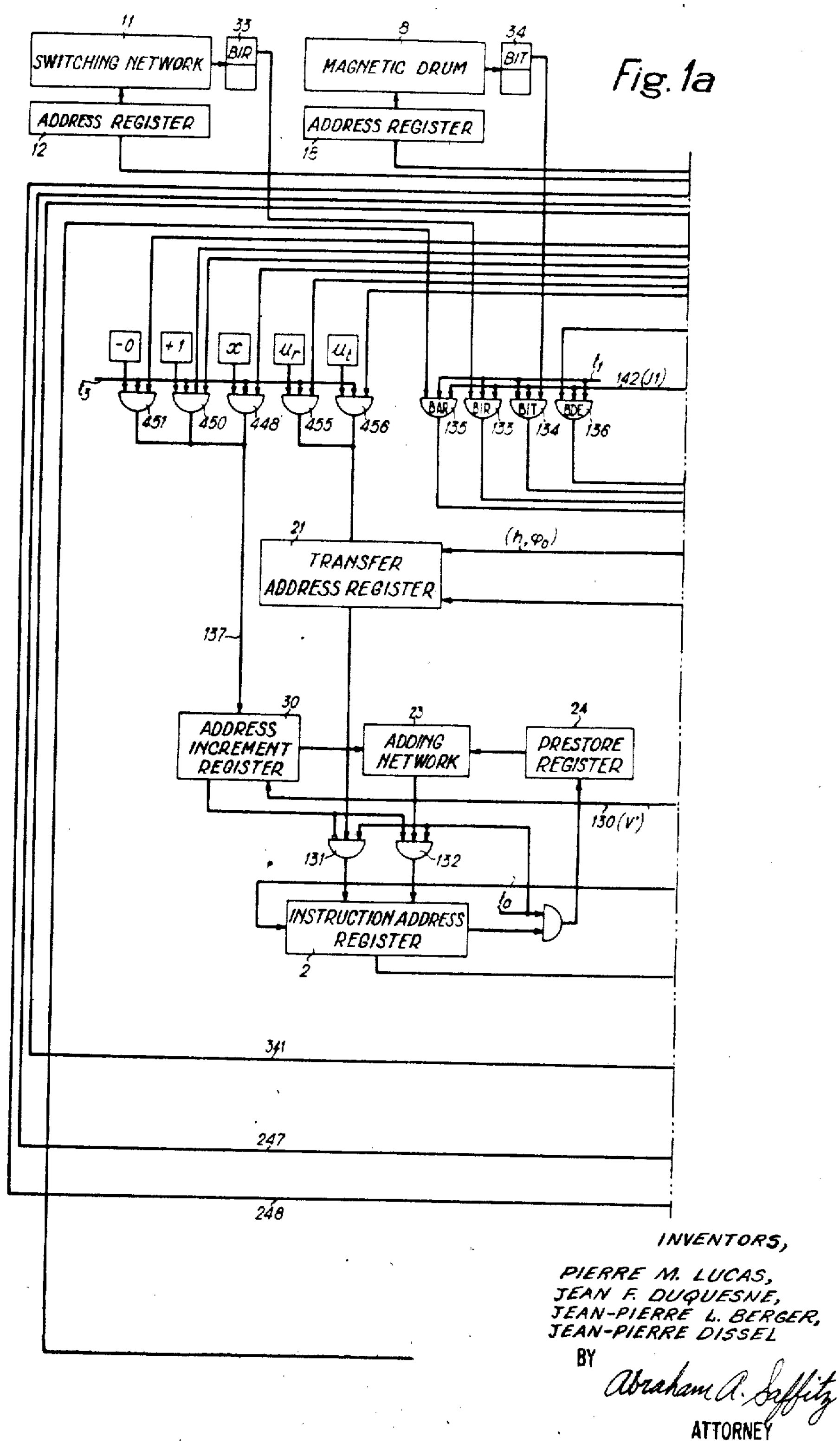
Figure 1B:
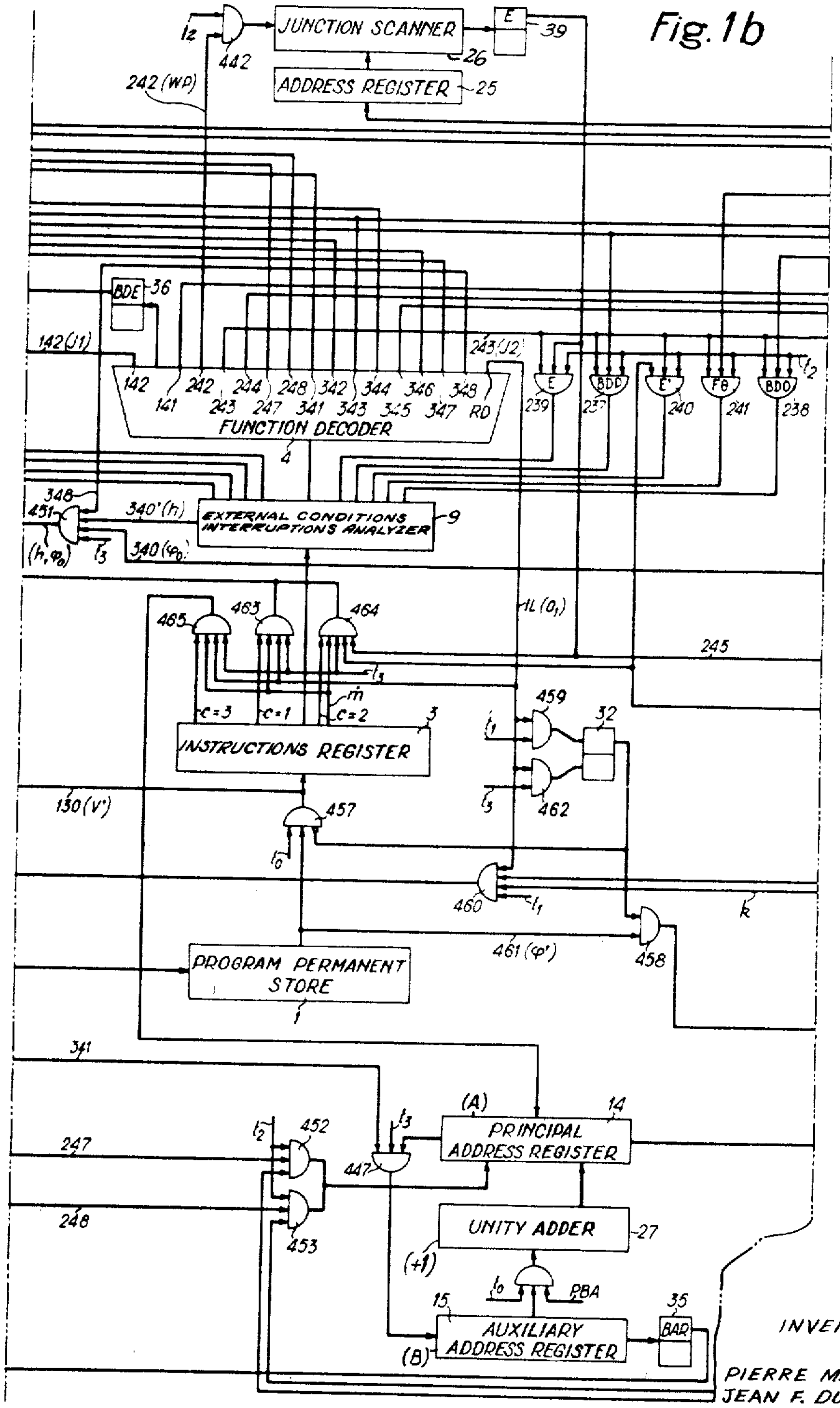
Figure 1C:
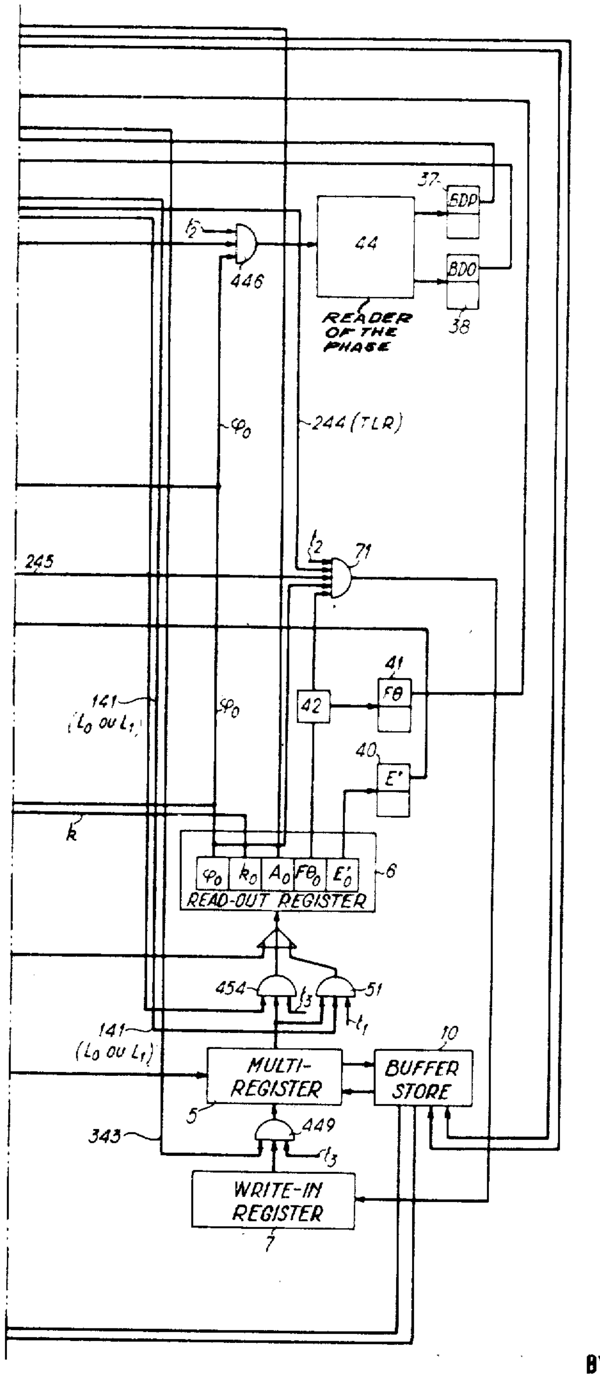
Figure 5:
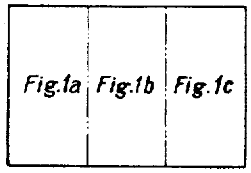
FIG. 5 shows the way for assembling side-by-side FIGS. 1*a*, 1*b* and 1*c* into the complete diagram of the computer.

The stored program computer according to the inventiont for telephone switching operates in cycles of four time intervals $t_0$–$t_3$ and mainly comprises:

A permanent program store 1 containing ordinary instructions each consisting of three orders $O_1$, $O_2$, $O_3$, special-function directives RD comprising an order $O_1$, an index *c* and an address *m* and a two-part "phase table";

A permanent program store read-out register, called the "instructions register," 3 to which the instructions read-out from the program store 1 are transferred, usually at a time $t_0$ of each cycle, in accordance with the address data item contained in an instructions address register. The same comprises an associated address increments register 30;

An instructions address register 2;

An instructions address computer comprising the address increments register 30 just mentioned, an auxiliary instructions address register 24, also called an instructions address prestore register, an adder-subtractor 23 and a transfer address register 21. The operation of this instructions address computer will be described hereinafter. All that need be stated now is that when the instructions follow one another in a permanent routine, the address of the next instruction is obtained from the address of the present instruction by the addition or subtraction of an address increment to or from the address of the present instruction through the agency of the system 24, 23, 30, 2 but when there is a program jump due to some external event, the new instruction address is obtained from the transfer address register 21;

An interruption analyser 9 serving to derive from external conditions tested during the first order of an instruction the constitution of the following orders of instruction;

A functions decoder 4, which decodes the orders $O_1$, $O_2$, $O_3$ at times $t_1$, $t_2$, $t_3$ respectively and the order $O_1$ of RD at the time $t_1$; consequently, signals controlling implementation of the function, as a rule by the opening or closing of gates, appear at an output terminal or at a number of output terminals of the decoder. The positioning and functions of these gates will be described in detail hereinafter;

A multi-register 5 equivalent to a plurality of telephone registers—i.e., a temporary store containing a group of words whose composition may be varied in time. These word groups comprise a number of associated partial words acting as a telephone register. Each word group relates to a call and will be called register hereinafter. The information contained in these words is broken down at the end of this chapter;

An address register 14 of the multi-register and an auxiliary address register 15 of the multi-register;

A read-out register 6 and a write-in register 7 both associated with the multi-register.

Composition of a register

Figure 2:
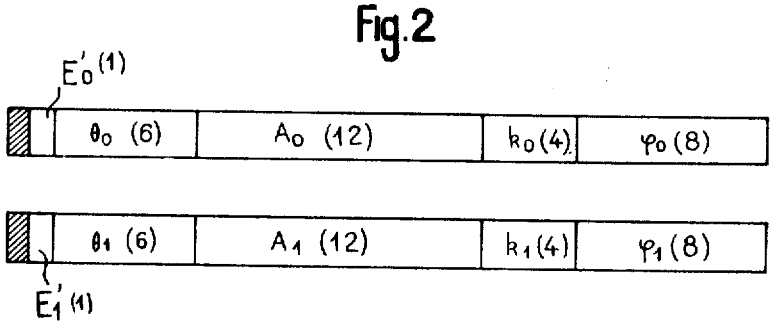
FIG. 2 shows the composition of the words written in the register.

A register consists of a number of words each consisting of 32 binary digits written into the temporary store 5. There is a fairly high number of such words in practice, but in order not to complicate this description only the two main words of the register, which are shown in FIG. 2, will be considered.

The first main word comprises: a first part $\varphi_0$ (eight binary digits) concerning the phase of the processor program;

A second part $k_0$ (four binary digits) which serves as a complement to the phase $\varphi_0$ to form a 12-binary-element address ($k_0$, $\varphi_0$) of the permanent store (second part of the phase table);

A third part $A_0$ (12 binary digits) concerning the address of the element to be tested (as a rule, this is a terminal of a junction on the calling side);

A fourth part $\theta_0$ (six binary digits) concerning a counting of the number of scans during a single phase of a fast-analysis program on an element to be tested the purpose of this word is to distinguish hanging-up and taking-down without dialing from dialing;

A fifth part $E'_0$ (one binary digit) concerning the former state of the element to be tested.

One of the pigeonholes of the register word is unused in the case of this description.

The second same word is completely similar to the first and comprises $\varphi_1$, $k_1$, $A_1$, $\theta_1$, $E'_1$, and the element to be tested is a terminal of the junction on the called side.

CHAPTER II

External circuits

The stored program conditional computer is connected to external circuits with which it can communicate.

The external circuits each comprise an address register, and the multi-register 5 is associated with a buffer store 10 having columns to the same number as there are external circuits, the columns containing the various addresses of the registers which have to exchange data with the external circuit or network. The registers communicate with the external circuits in turn. The addresses of the registers requiring to communicate with an external circuit are stacked in the buffer store column associated with such external circuits, and the stack descends by one pigeonhole at each response o fthe external circuit. At any given time, the register awaiting a reply from an external circuit is the register whose address is in the bottom pigeonhole of the stack for such external circuit in the buffer store. The address of this bottom-stack pigeonhole will be indicated hereinafter with regard to each external circuit.

The external circuits are as follows:

A. A switching network 11 associated with an address register 12, the same containing the address $a_r$ of the bottom pigeonhole of that column of the buffer store 10 which relates to the switching network 11, such pigeonhole itself containing the address of the register with which the switching network communicates.

Associated with the network 11 is a flip-flop 33 (BIR) which operates when the network 11 calls the multi-register. Matters are so devised that the calling of the network 11 is always intended for a designated register, and to this end a register which is the first to be seized in the event of a calling of the network 11 not intended for an already designated register (case of seizure of a register by calling subscriber) is designated amongst the free registers. The first register to be seized is called the sentry or picket register;

B. A junction scanner 26 associated with an address register 25 containing the address $A_0$ or $A_1$ of the junction which the multi-register is about to test. It is the same address $A_0$ or $A_1$ which is written into the register.

Associated with junction scanner 26 is a flip-flop 39 (E) which comes into operation when the junction being tested by the junction scanner receives a signal from the incoming line. There is also a second flip-flop (not shown) which performs the same function as 39 (E) but for the outgoing line connected to the junctor;

C. A magnetic drum 8 associated with an address register 18 containing the address $a_t$ of the bottom pigeonhole of the buffer store column associated with the magnetic drum, such pigeonhole itself containing the address of the register with which the magnetic drum communicates. Associated therewith is a flip-flop 34 (BIT) which comes into operation when the drum 8 calls the multi-register;

D. A flip-flop 35 (BAR) which is connected to the auxiliary address register 15 of the multi-register and which comes into operation when the final register of the multi-register has been scanned—i.e., read;

E. A flip-flop 40 (E') connected to that pigeonhole of the read-out register 6 of the multi-register 5 which contains either the data item $E'_0$ or the data item $E'_1$, according to the case;

F. A flip-flop 41 (F$\theta$) connected to a carry-over output of the "+1" adder 42 interposed between read-out register 6 and re-write-in register 7, the unit adder 42 serving to increase by one unit the data item F$\theta$ contained in the register. The flip-flop 41 comes into operation when a number of identical passages has been effected by the processing program of any single register—i.e., in cases in which the scanned line has a signal on it for a time greater than the duration of a dialing pulse, during consecutive scannings of the junctions;

G. A flip-flop 36 (BDE) which asks for the designation of a picket register. It is assumed that the previous picket register has been seized during a calling of the switching network 11 and so some other picket register must be designated. To this end, the sub-program corresponding to the request of a picket register comprises in one of its directives a positioning order for the flip-flop 36. When decoded such order actuates a particular output of the functions decoder 4 for driving the flip-flop 36;

H. A flip-flop 37 (BDP) which translates the fact that a second fundamental directive $IF_1$ is to follow the fundamental directive $IF_0$. This condition is expressed by the value of some special binary elements of the phase $\varphi_0$. Flip-flop 37 is connected to a phase detector 44 connected to some of the pigeonholes of the read-out register 6;

I. A flip-flop 38 (EDO) which translates the fact that a register is engaged. This condition is expressed by the value of a particular element of the phase $\varphi_0$. Flip-flop 38 is connected to phase detector 44 which is connected to some of the pigeonholes of read-out register 6.

The external conditions are classified in two groups, the first group being represented by the respective states of the flip-flops 33 (BIR), 34 (BIT), 35 (BAR), 36 (BDE) and the second group being represented by the state of the flip-flops 37 (BDP), 38, (BDO), 39 (E), 40 (E') and 41 (F$\theta$).

CHAPTER III

Composition of permanent program store

The permanent program store 1 serves mainly to contain the operations program of the automatic switching system and sundry permanent data items including the "phase table."

The operations program and the phase table are made up of store words each consisting of 32 binary elements. The words which make up the program are called instructions and comprise three elementary orders $O_1$, $O_2$, $O_3$ performed consecutively at times $t_1$, $t_2$, $t_3$ in a single cycle. The instruction is read-out from the permanent store at the start ime $t_0$ of the cycle. More accurately, an instruction is made up of the following elements:

Three elementary orders ($O_1$, $O_2$, $O_3$) each containing eight binary digits;

An address increment V' consisting of four binary digits, one of which is a sign digit, for designating sixteen values graded from $-7$ to $-0$ and from $+0$ to $+7$, representing the algebraic number which must be added to the address of the present instruction to obtain the address of the next instruction in the unconditional operation.

The other binary digits are not used in this description.

The ordinary instructions and the fundamental instructions $IF_0$ and $IF_1$ (Chapter IV) have this structure.

The directive RD having the special function of reading-out a variable routine from the permanent store has the same structure except for the orders $O_2$ and $O_3$. As will be seen in Chapter V, the sixteen binary elements which form the orders $O_2$ and $O_3$ in the usual case are processd here as a block and not consecutively. They represent:

An order complement of four binary elements $c$, and

A parameter $m$ of 12 binary elements which is a transfer address.

Also in contrast to ordinary instructions, which cause a permanent store read-out only at the time $t_0$, the directive RD causes a permanent store read-out at the times $t_0$ and $t_2$ of the four-phase cycle; consequently, the directive RD can first be extracted from the permanent store at time $t_0$ and cause a further instruction to be extracted at time $t_2$ from the second part of the phase table.

Figure 3:
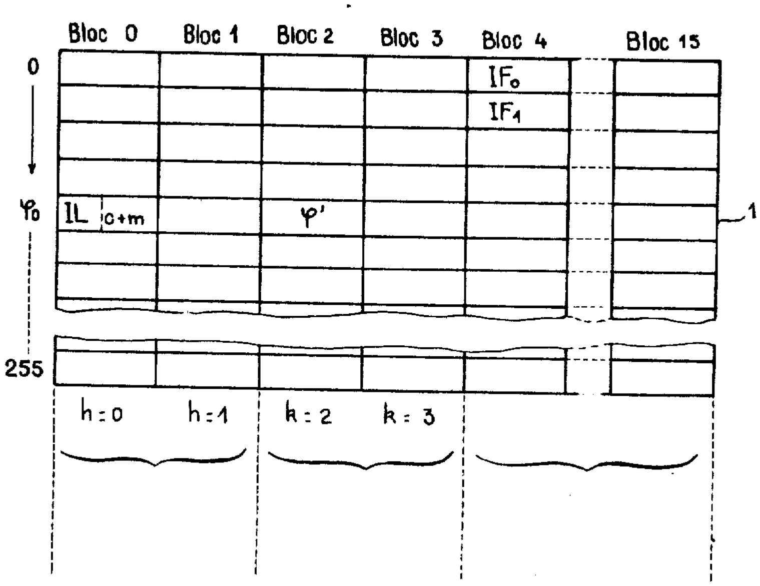
FIG. 3 shows the arrangement of the permanent program store including the phase table.

The marshalling of data in the permanent store will be described with reference to FIG. 3.

It was assumed that the store comprised 4096 words consisting each of 32 binary elements and could therefore be addressed by means of 12 binary digits. These 4096 words are assumed to be distributed in 16 blocks or sections denoted by addresses $h$ or $k$ consisting of four binary elements. Each section comprises 256 word characterized by an eight-binary-element address which will be called $\varphi_0$ hereinafter. The $h=0$ and $h=1$ sections form the first part of the phase table which mainly comprises the routing directives RD whose parameter $m$ represents the address of the first instruction of the routine which will be implemented after read-out of the phase table. The $k=2$ and $k=3$ sections form the second part of the phase table comprising the instructions of the routine having $\varphi_0$ or $m$ as address of its first instruction, this first instruction being an order of transfer of the serial number $\varphi'$ of this routine into the processed register. The sections $h=0$ and $k=2$ relate to the first fast program $PMR_0$ (corresponding to the fundamental instruction $IF_0$). The sections $h=1$ and $k=3$ relate to the second fast program $PMR_1$ (corresponding to $IF_1$). The other twelve sections of the permanent store contain the ordinary instructions of the program, including the fundamental instructions $IF_0$ and $IF_1$

CHAPTER IV

Make-up of fundamental instruction $IF_0$

*IV. 1. Address shifting in the multi-register.*—The fundamental instruction $IF_0$ is preceded at the time $t_0$ by an address shift order involving the main address register 14 (A) and the auxiliary address register 15 (B) of the multi-register 5. This order is styled PBA. Since the present address is represented by the content of register 15 (B), the order PBA transfers the content of register 15 to the main address register via unit adder 27 which adds one unit to the content of register 15. This address shifting in the multi-register does not occur at the time $t_0$ preceding the fundamental instruction $IF_1$, since the program $PMR_1$ concerns the same register as the program $PMR_0$.

*IV. 2. Address shifting in the permanent program store.*—A shift in the instructions address register 2 occurs at the time $t_0$ and can take two different forms.

As already explained, an address increment V' is associated with each instruction; at each instruction read-out, simultaneously as the instruction is transferred from the permanent program store 1 to the instructions register 3 the address increment is transferred to the address increments register 30 (connection 130). The address of the previous instruction goes from the instructions address register 2 to the auxiliary instructions address register 24. The previous address and the address increment removed from the auxiliary instructions address register 24 and from the address increments register 30 respectively are added in the adder-subtractor 23 and the resulting address is introduced into the instructions address register 2 via gates 132. This resulting address is the address of the next instruction.

The address increment is a number which can vary between $-7$ and $+7$, one of its binary digits representing the sign. The fundamental instruction $IF_0$ has an address increment equal to $+0$ and is therefore looped back on itself in the absence of program jump. The fundamental instruction $IF_1$ has an address increment of $-1$ and is placed in the permanent program store at the address following the instruction $IF_0$—i.e., it has an address greater by one unit than the address of $IF_0$. The instruction $IF_1$ is therefore looped back to $IF_0$ in the absence of program jump.

The instructions address register 2 can also be filled in from the transfer address register 21 whose content can be transferred to address register 2 via gates 131 at time $t_0$. This operation occurs when the increment in 30 has a particular value assumed hereinafter to be $(-0)$ (sign flip-flop in zero state). The increment $(-0)$ opens the gates 131 and closes the gates 132.

*IV. 3. Orders contained in instruction $IF_0$*—Like all the instructions, the fundamental instruction $IF_0$ comprises three orders $O_1$, $O_2$, $O_3$ each consisting of eight binary digits and implemented at the times $t_1$, $t_2$, $t_3$. These orders are transferred from the permanent program store 1 to the instructions register 3 at the time $t_0$. The order $O_1$ comprises the read-out of a telephone register and the testing and the registering of a first group of external conditions. The orders $O_2$, $O_3$ depend upon the occurrence or non occurence of external conditions and, in the former case, upon their origin.

*IV. 4. Order $O_1$, read-out of register and detection of external conditions.*—The register word is read out— i.e., transferred from multi-rgeister 5 to read-out register 6 via gates 61 which are opened by order $O_1$ via line 141. The functions decoder 4 is shown as having a number of output terminals, some of which have a number which starts with a 1 and which are energised by the order $O_1$ at the time $t_1$, while others have a number which starts with a 2 and are energised by the order $O_2$ at the time $t_2$, and still others have a number which starts with a 3 and are energised by the order $O_3$ at the time $t_3$. Since the signals appear at terminals whose numbers start with a 1 or 2 or 3 respectively at different times, several functions could be controlled by a single terminal, but for the sake of clarity of the description this has not been done. The read-out order is called $L_0$ or $L_1$, according as it belongs to the program $PMR_0$ or $PMR_1$, and results, depending upon the case, in a read-out of either the first or the second of the words of the telephone register (FIG. 2).

The external conditions (first group) supplied by the flip-flops 33 (BIR), 34 (BIT), 35 (BAR) and 36 (BDE) are transferred to the interruptions analyzer 9 via gates 133–136 controlled by a wire 142 (order $J_1$).

The conditions thus stored are used to define the orders $O_2$ and the sequence-breaking addresses. The conditions "BAR in operation" and "BDE in operation" are tested only by the order $O_1$ of the instruction $IF_0$; they are of no concern in the directive $IF_1$ for they are as a rule never encountered in the fast-analysis program $PMR_1$.

*IV. 5. Order $O_2$ in the absence of interruption.*—If none of the flip-flops 33 (BIR), 34 (BIT) or 35 (BAR) is operative at the time $t_1$, a test of the supervised point is made at the time $t_2$ by the junctor scanner 26 orientated by the content $A_0$ of register 6 (order WP, wire 242 and gate 442), whereafter the states of the flip-flops 39 (E), 40 (E') and 41 ($F\theta$) (second group of external conditions) are transferred to the interruptions analyzer 9. This transfer (order $J_2$) is effected via the gates 239, 240, 241 respectively, which are controlled by wire 243. The state of the flip-flops is used to define the conditional jump to be made from the instruction $IF_0$ or $IF_1$, and, where applicable, the conditional jump to be made to the directive RD.

At the same time $t_2$ a transfer with shifting is made from the read-out register 6 to the re-write-in register 7 (order TLR). Gate 71 is opened by way of wire 244; the part $F\theta$ of the complete register word is rewritten in via a "+1" adder 42, and the part E' is taken not from the read-out register, whose information on the previous state of the tested point is out of date, but from flip-flop 39 (E) via connection 245.

The operations at the time $t_2$ also comprise (order $J_3$) testing of some binary elements of the phase $\varphi_0$, so as to determine whether a fast-analysis program $PMR_1$ is necessary, in which event an instruction $IF_1$ must be implemented on the same register. This test is performed by the phase-detecting circuit 44 which actuates the flip-flop BDP, if an instruction $IF_1$ is to be initiated, and the flip-flop BDO too, if the register is engaged.

*IV. 6. Order $O_3$ in the absence of interruption.*—The interruptions analyser 9 has received the data from the flip-flops 33 (BIR), 34 (BIT), 35 (BAR) and 36 (BDE) at the time $t_1$ and the data from the flip-flops 37 (BDP), 38 (BDO), 39 (E), 40 (E') and 41 ($F\theta$) at the time $t_2$. If there is no interruption (BIR=BIT=BAR=0) seven cases can be distinguished for the instruction $IF_0$ (only five for the instruction $IF_1$, since the first two are of no concern), according to the state of the flip-flops E, E', $F\theta$, BDO and BDE. These seven cases are as follows:

(1) idle register:

$$BDO=BDE=0$$

(2) idle register and request of a picket register:

$$BDO=0 \quad BDE=1$$

(3) register engaged but no change nor expiry of delay:

$$BDO=1 \quad E=E' \quad F\theta=0$$

4 to 7—register engaged and special event (change of state of tested point or expiry of delay)

(4) $BDO=1$ $E=0$ $E'=1$ $F\theta=0$ or 1
(5) $BDO=1$ $E=1$ $E'=0$ $F\theta=0$ or 1
(6) $BDO=1$ $E=0$ $E'=0$ $F\theta=1$
(7) $BDO=1$ $E=1$ $E'=1$ $F\theta=1$ In all of cases 1–7, an address prestore is made from the main address register 14 to the auxiliary address register 15 if the multi-register at the time $t_3$. The address prestore order is called TAB and serves to prepare the address advance in the multi-register at the time $t_0$ of the next instruction $IF_0$.

1st case: no order other than the address prestore order TAB is implemented at the time $t_3$. Accordingly, gate 447 is opened via wire 341. Since, as already been seen, the address increment of the fundamental instruction $IF_0$ was zero, the next instruction is another funadamental instruction which applies to the next register.

2nd case: a fresh address $x$ is introduced into the address increments register 30 via gate 448 controlled by wires 342 and 137. The new address $x$ is the address of the first instruction of the sub-routine of alloting a register as picket register.

3rd case: the order $O_3$ is an order to re-write (order $E_0$) the content of the re-write-in register 7 into the telephone register actually being processed via gates 449 controlled via wire 343. If in this case $BDP=1$, the address increment (+1) is introduced into the address increment register 30 via gate 450 controlled by wire 343, so that the fundamental instruction $IF_0$ is followed by the fundamental instruction $IF_1$.

4th to 7th cases: the order $O_3$ consists of an order to jump to the routing directive RD for read-out from the second part of the phase table. The address increment (−0) is introduced into the address increment register 30 via gate 451' controlled by wire 344; consequently, the instructions address register 2 is controlled not by increments but by the introduction of a transfer address. The same is the address $(h, \varphi_0)$ and is introduced into the transfer address register 21 via gates 451 opened by wire 348. Simultaneously as $\varphi_0$ is introduced into register 21, a constant number $h$ having a value which differs according to whether the actual instruction is a fundamental instruction $IF_0$—in which event $h=0$—or a fundamental instruction $IF_1$—in which event $h=1$—is introduced into the transfer address register 21 by the interruptions analyzer 9 (wire 340'). The instruction which has for its address $(h, \varphi_0)$ is a directive RD stored in the first part of the phase-table.

*IV. 7. Order $O_2$ in the presence of interruption.*—In the event of interruption (BIR or BIT or BAR operating), the address of the register in the address pigeonhole $a_r$ or $a_t$ of the buffer store is introduced into the main address register 14 of the multi-register. If the interruption comes from the switching network 11—i.e. if the interruption is due to flip-flop 33 operating—the address of the telephone register introduced into the main address register 14 is the address disposed at the address $a_r$ of that column of the buffer store 10 which deals which exchanges with the switching network 11. If the interruption is due to the magnetic drum—i.e. to the flip-flop 34 operating—the address of the telephone register introduced into the main address register 14 is the address appearing at the address $a_t$ of that column of the buffer store 10 which deals with exchanges with the magnetic drum 8. These transfers between the buffer store 10 and the main address register 14 are supervised by gates 452, 453, controlled by wires 247, 248.

*IV. 8. Order $O_3$ in the event of an interruption.*—A read-out order is given by wire 345 to the multi-register and the register word of address $a_r$ or $a_t$ is written into read-out register 6 via gates 454. Simultaneously, a predetermined value $u_r$ or $u_t$, depending upon whether the address introduced into 14 is the address of the telephone register found in the address pigeonholes $a_r$ or $a_t$ of the buffer store 10, is introduced into the transfer address register 21, and the address increment in 30 is made (−0). $u_r$ is introduced into 21 via gates 455 controlled by wire 346. $u_t$ is introduced into 21 via gates 456 controlled by wire 347. (−0) is introduced into 30 via gate 451 controlled by wire 344.

CHAPTER V

Action of directive RD of reading-out-from the permanent instruction store

The directive RD is extracted from the permanent program store by the mechanism just outlined in paragraph IV.6, 4th to 7th case. Its address $(h, \psi_0)$ has been introduced from 21 into the instructions address register 2. The permanent program store is activated at the time $t_0$ and the directive RD is introduced into the instructions register 3.

The special function directive RD, instead of being formed by three orders $O_1$, $O_2$, $O_3$, each of eight binary digits and by an address increment, like the ordinary instructions, is formed, as already stated, by the following parts:

- an eight bit word representing an order $O_1$;
- an order complement $c$ consisting of four bits, whose function will be detailed hereinafter;
- a twelve bit word forming a parameter $m$ for use as a transfer address, and
- an address increment V'.

The word $O_1$ of directive RD keeps the place of the first order $O_1$ of the ordinary instructions; the word $c$ and the first four digits of the word $m$ take the place of the order $O_2$ of the ordinary instructions, and the last eight bits of the word $m$ take the place of the order $O_3$. Decoding of the order $O_1$ marks a particular output terminal RD of the functions decoder 4.

The action of the special-function directive RD is as follows:

(1) The permanent program store 1 is activated for a first time at the time $t_0$; the special function directive is introduced into the instructions register 3, and its address $(h, \varphi_0)$ is prestored in the auxiliary instructions address register 24.

(2) The order $O_1$ is decoded at the time $t_1$ and a signal appears at the RD terminal of the functions decoder 4. Such signal acts via gate 459 to change-over flip-flop 32 into the one state, so that gates 458 open and gates 457 close and store 1 is connected to read-out register 6, in preparation for a transfer which will take place at the time $t_2$. Simultaneously, a predetermined fraction of the content of read-out register 6, in the form of the binary digits $k$ and $\varphi_0$ of the register word (or in the form of digit $k$ alone since $\varphi$ is already prestored in register 24), is transferred to the instructions address register 2 via gates 460, $k$ can, for instance, have the value $k_0=0010$, if the original fundamental instruction is an $IF_0$ instruction, and the value $k_1=0011$ if the original fundamental instruction is an $IF_1$ instruction.

(3) The permanent program store 1 is actuated again at the time $t_2$, the instructions address register this time containing the address $(k, \varphi_0)$, and the directive having this address in the second part of the phase table is transferred via wires 461 and gates 458 to read-out register 6. This second part of the phase table contains at address $(k, \varphi_0)$ the fresh value $\varphi'$ of the phase which will be allotted to the telephone register and the instructions of which it will now implement.

(4) Flip-flop 32 is reset via gate 462 at the time $t_3$, so that normal relationships are restored between the permanent program store 1 and the multi-register 5 and their respective registers—i.e., the instructions register 3 and the read-out register 6—by closure of the gate 458 and opening of the gates 457.

Simultaneously, the parameter $m$ contained in the instructions register 3 is transferred either to the transfer address register 21 or to the address register 14 of the multi-register 5. The choice of the register to which the transfer is made depends upon the value of the order complement $c$ as follows:

If $c=1$, parameter $m$ is transferred to the transfer address register 21 by the opening of gates 463;

If $c=2$, only some binary digits of $m$ are transferred to 21 and the places of the non-transferred digits are taken by the contents of the flip-flops 39 (E) and 40 (E') representing the present state and the former state of the tested point during the fundamental instrucion which preceded the present special-function directive (opening of gates 464);

If $c=3$, the parameter $m$ is transferred integrally to the multi-register address register 14 (opening of gates 465); and If $c=4$, no transfer takes place.

It was assumed in the foregoing that the first instruction of the routine following the jump controlled by the special-function directive was the transfer into the telephone register actually processed of the new phase $\varphi'$ and that said new phase was written at address $(k, \varphi_0)$ in the second part of the phase table. Moreover and indeed, the new phase could be written in said second part at address $m$; in such a case, $k$ is transferred to address register 2 via gates 460 and $m$ is transferred to address register 2 via transfer address register 21. The remaining of the operation is the same.

CHAPTER VI

Operation of the computer

For a better understanding of the mechanism by which the phase of a telephone register is changed by read-out of the phase table in the permanent store, a detailed description will now be given of the operations occurring when the fast-recurrence analysis program $PMR_0$ processes a register supervising a line whose state has just changed (e.g. start of a dialing pulse on the subscriber's loop).

Such a register is in a phase $\varphi_0$ different from the rest and idle phase, and it will be assumed that there is no need to perform a second fast-analysis program $PMR_1$. The delay $\theta_0$ of the register has any value other than its maximum value. The bit $E'_0$ is 1, indicating that the loop of the supervised line was previously closed. The register also contains the address $A_0$ of the junction to which the subscriber's line is connected (via the switching network) and in which the loop state test point accessible to the scanner 26 is disposed.

The fast-analysis program $PMR_0$ reaches the particular telephone register concerned during the course of a fundamental instruction $IF_0$. The operations performed during this instruction are as follows:

At the time $t_0$:

The address of the instruction $IF_0$ is introduced into 2. Depending upon circumstances, this address was contained in 21 or results from the calculation made by 23 with the content of 24 (former address) and the content V' of 30 (address increment).

A PBA type advance is made in the multi-register. The main address register 14 receives the address of the previous register as prestored in 15, increased by one unit by the unit adder 27;

The program permanent store 1 is actuated and the instruction whose address lies in 2 is introduced into the instructions register 3. In the case under consideration, the instruction is a fundamental instruction $IF_0$;

The address contained in 2 is prestored in register 24 to prepare for address advance at the time $t_3$ of the cycle.

At the time $t_1$:

The multi-register 5 is actuated and the first word of the register whose address is contained in 14 is introduced into read-out register 6;

It is assumed that the sensing of the external condtions on the flip-flops BIR, BIT, BAR, BDE which would normally occur at time $t_1$ does not lead to any of these flip-flops operating in the case under consideration.

At the time $t_2$:

Since there is no interruption of the instruction $IF_0$, a test of the supervised point is made by the junction scanner 26 oriented in accordance with the junction address $A_0$ contained in the read-out register 6. The result of this test is transferred to the flip-flop 39 (E). In the case under consideration, $E=0$ since we are dealing with the start of a dialling pulse (opening of the loop);

The former-state flip-flop 40 (E') is positioned in accordance with the binary digit $E'_0$ contained in the register 6. In the case under consideration, $E'=1$ since the subscriber's loop was previously closed;

Simultaneously, the contents of read-out register 6 are transferred to the re-write register 7; the parts $\varphi_0$, $k_0$, $A_0$ are transferred without modification but the part $\theta_0$ is transferred with the addition of one unit by the unit adder 42 and the data item $E'_0$ is re-written-in not from 40 but from 39 which contains the new test (wire 245).

The test of the present value of the phase $\varphi_0$ which can act via the phase detector 44 upon the flip-flops 37 (BDP) and 38 (BDO) leads to 38 (BDO) operating since the register is engaged. It is assumed that in the present case, since a second fast-analysis program is not necessary, the flip-flop BDP remains in the zero state.

At the time $t_3$:

The conditions of the flip-flops 39 (E), 40 (E'), 41 ($F\theta$), 36 (BDE), 37 (BDP) and 38 (BDO) which have been transferred into 9 at time $t_2$ are translated by the interruptions analyzer. It was assumed that:

$$E=0 \quad E'=1 \quad F\theta=0 \text{ or } 1 \quad BDO=1 \quad BDE=BDP=0$$

Case No. 4 therefore applies and the following steps are performed:

Transfer of the contents of 14 to 15 (instruction TAB) to prepare for register address shifting (wire 341);

Zero resetting of the address increment register 30 so as to obtain the particular address increment value (−0) corresponding to the use of a transfer address (wire 344);

Introduction into register 21 (wire 348) of the value of the phase $\varphi_0$ completed by the constant $h$, the value $\varphi_0$ being obtained by a transfer from the read-out register 6, so that the transfer address is exactly defined, the same being in the case under consideration the address of one of the RD directives which make up the first part of the phase table.

The program has thus jumped to a new routine which is initiated by the special-function RD directive.

At the time $t_0$:

The address of the RD directive which is the number $(h,\varphi_0)$ contained in 21 is introduced into 2 because of the particular value (−0) of the increment in 30;

The program permanent store 1 is actuated for the first time and the instruction which has as its address $(h,\varphi_0)$, i.e. the actual RD directive, is transferred into the instructions register 3;

The address contained in 2 is prestored in 24.

At the time $t_1$:

The order $O_1$ of the RD directive is decoded and a signal appears at the RD terminal of the functions decoder 4;

The store change flip-flop 32 is actuated and changes over the output of store 1 to the input of read-out register via gates 6;

The address of the instruction to 458 be read-out next time ($k$, $\varphi_0$), which is contained in register 6, is transferred via gates 460 to address register 2.

At the time $t_2$:

The permanent store 1 is actuated a second time and the address ($k$, $\varphi_0$) designates a word written in the second part of the phase table which is the value $\varphi'$ of the phase now to be processed. The new phase $\varphi'$ is introduced into the read-out register 6, via wire 461 and gates 458, where it replaces the old phase $\varphi_0$.

At the time $t_3$:

The flip-flop 32 is reset to zero;

The address $m$ of the first instruction of the phase $\varphi'$ plus the data items E and E' recorded in the corresponding flip-flops 39 and 40, is transmitted to transfer register 21 through gates 464 to form one of the four possible transfer addresses in accordance with the respective values of E and E' (i.e. according as the case found was one of cases 4 to 7). In the case under consideration, the new routine concerns the start of a dialling pulse, the address of the first instruction of this routine now being contained in the transfer register 21;

The address increment V' in 30 is still (—0) so that the instructions address register 2 is being controlled by means of transfer addresses and not of incremental addresses.

The operations of the new routine will not be detailed here. All that will be stated is that such operations comprise modifying the former value $\varphi_0$ of the phase written into the telephone register processed by the new value $\varphi'$ which was introduced into 6 during the RD directive.

The various cases of transfer for the parameter $m$ contained in the RD directive, effected at the time $t_3$ in accordance with the value of the order complement $c$, are used in accordance with the nature of the data item represented by $m$ and in accordance with the operations which the next routine is required to perform.

The case $c=1$ in which the address m is entirely transferred into the transfer address register 21 corresponds to the case where the new phase $\varphi'$ is composed by a single set of well-defined instructions.

The case $c=2$ in which the address $m$ is partially transferred into the transfer address register 21 together with other data items derived from the external conditions corresponds to the case where the new phase $\varphi'$ has selective compositions depending upon said external conditions. Then a part of the address of the first instruction of the new routine depends upon the external conditions.

With case $c=3$, a search can be made in the permanent store 1 not for the starting address of a new routine, with the aim of immediate implementation of the instructions thereof, but for the address of a telephone register, address which will be used by the address register 14 of the multi-register. Considering, for instance, the consecutive addresses of the telephone registers, it may be decided to distribute them in groups of telephone registers performing a similar work, such as dialling code registers, multi-frequency code registers, supervisory registers and so on. When program performance reaches the time at which it is required to process a particular category of registers whose addresses are distributed, for instance, from $m_1$ to $m_2$, it is useful to be able to look for the value of the initial value $m_1$ in the permanent store 1 at a particular address $\varphi_0$. This can be obtained by means of an IL directive disposed at the address $\varphi_0$ and containing $m_1$ as a parameter. Implementation of this IL directive leads to the value $m_1$, the initial address looked for being introduced into address register 14 of multi-register 5.

With the case $c=4$, it becomes possible to introduce into the register 6, which initially contains any permanent store address ($h$, $\varphi_0$), the contents of the word read at such address without disturbing the register 14 or register 21. This case is found at read-out of a permanent store table, for instance, when it is required to extract all the data concerning a particular junctor whose order number ($h$, $\varphi_0$) is given and of which it is required to know the address of the switching network terminal to which it is connected and its different discriminations.

FIG. 4 is a breakdown of the composition of the orders $O_2$ and $O_3$ of the $IF_0$ fundamental instruction in accordance with the two groups of external conditions. In this table, the sign $\varphi$ means 0 or 1.

What we claim is:

1. A conditional stored program computer for controlling a telephone switching network adapted to connect subscribers' lines to junctions and to disconnect said subscribers' lines from said junctions comprising a program permanent store including a first storing area having stored therein fixed sequences of instructions forming permanent routines and address increments respectively associated with said permanent routine instructions, a second storing area having stored therein variable sequences of instructions forming variable routines and address increments respectively associated with said variable routine instructions and a third storing area having stored therein jump instructions having as addresses serial numbers given to the routines and substantially formed by a first part consisting of a routine serial number and a second part consisting of the address of the first instruction of said routine, an instruction address computer adapted to derive the address of a permanent routine instruction to be implemented from the address of the previous implemented permanent routine instruction and the address increment associated therewith, a transfer instruction address register, means for selectively controlling said program permanent store by said instruction address computer and said transfer instruction address register, a plurality of telephone registers adapted to store the dialling signals applied to the junctions by the subscribers' lines connected thereto, the connection and disconnection signals applied to said switching network by said stored program computer and the serial numbers of the routine being processed, detecting means of said dialling signals and connection and disconnection signals, means for deriving from said detecting means routine jumping signals, means controlled by said jumping signals for transferring into said transfer instruction address register the serial number of the routine stored in the telephone register being processed, means for extracting from said program permanent store the jump instruction having as its address said routine serial number, means for transferring into said telephone register being processed the number of the new rountine forming the first part of said jump instruction and means for transferring into said transfer instruction address register the instruction address forming the second part of said jump instruction.

2. A conditional stored program computer for controlling a telephone switching network adapted to connect subscribers' lines to junctions and to disconnect said subscribers' lines from said junctions comprising means for defining recurrent computer operation cycles, a program permanent store including a first storing area having stored therein fixed sequences of instructions forming permanent routines and address increments respectively associated with said permanent rountine instructions, a second storing area having stored therein variable sequences of instructions forming variable routines and address increments respectively associated with said variable routine instructions and a third storing area having stored therein jump instructions having as addresses serial numbers given to the routines and substantially formed by a first part consisting of a routine serial number and a second part consisting of the address of the first instruction of said routine, an instruction address computer adapted to derive the address of a permanent routine instruction to be implemented from the address of the previous implemented permanent routine instruction and the address increment associated therewith, a transfer instruction address register, means for selectively controlling said program permanent store by said instruction address computer and said transfer instruction address register, means for extracting from said program permanent store permanent routine instructions during an operation cycle, a plurality of telephone registers adapted to store the dialling signals applied to the junctions by the subscribers' lines connected thereto, the connection and disconnection signals applied to said switching network by said stored program computer and the serial numbers of the routines being processed, detecting means of said dialing signals and connection and disconnection signals, means for deriving from said detecting means routine jumping signals, means controlled by said jumping signals for transferring into said transfer instruction address register the serial number of the routine stored in the telephone register being processed, means for extracting, during the first half of an operation cycle, from said program permanent store the jump instruction having as its address said routine serial number and means for transferring, during the second half of said operation cycle, into said telephone register being processed the number of the new routine forming the first part of said jump instruction and into said transfer instruction address register the instruction address forming the second part of said jump instruction.

References Cited

UNITED STATES PATENTS 3,385,932 5/1968 Masure et al.

KATHLEEN H. CLAFFY, Primary Examiner

T. W. BROWN, Assistant Examiner

U.S. Cl. X.R.

340—172.5